(12) United States Patent
Erdmann

(10) Patent No.: US 10,277,455 B2
(45) Date of Patent: Apr. 30, 2019

(54) METHOD FOR OPERATING A NODE IN A NETWORK AND NODE DEVICE

(71) Applicant: SIGNIFY HOLDING B.V., Eindhoven (NL)

(72) Inventor: Bozena Erdmann, Aachen (DE)

(73) Assignee: SIGNIFY HOLDING B.V., Eindhoven (NL)

( * ) Notice: Subject to any disclaimer, the term of this patent is extended or adjusted under 35 U.S.C. 154(b) by 0 days.

(21) Appl. No.: 15/101,228

(22) PCT Filed: Dec. 8, 2014

(86) PCT No.: PCT/EP2014/076805
§ 371 (c)(1),
(2) Date: Jun. 2, 2016

(87) PCT Pub. No.: WO2015/086478
PCT Pub. Date: Jun. 18, 2015

(65) Prior Publication Data
US 2016/0301563 A1    Oct. 13, 2016

(30) Foreign Application Priority Data

Dec. 9, 2013 (EP) ..................... 13196248

(51) Int. Cl.
*H04L 12/24* (2006.01)
*H04L 1/18* (2006.01)
(Continued)

(52) U.S. Cl.
CPC ........ *H04L 41/0668* (2013.01); *H04L 1/1835* (2013.01); *H04L 1/1854* (2013.01);
(Continued)

(58) Field of Classification Search
CPC ........ H04W 80/04; H04W 8/26; H04L 12/56; H04L 2012/56; H04L 49/1523;
(Continued)

(56) References Cited

U.S. PATENT DOCUMENTS 9,723,618 B2 * 8/2017 Loehr ................... H04W 72/10
2004/0081133 A1 4/2004 Smavatkul et al.
(Continued)

FOREIGN PATENT DOCUMENTS

CN    101340213 A    1/2009
CN    101572912 A    11/2009
(Continued)

*Primary Examiner* — Brenda H Pham

(57) ABSTRACT

The invention relates to a method for operating a node in a network comprising a resource restricted device, the method comprising the steps of (a) placing an ACK message in a buffer of the node, if said buffer does not contain a buffered message to be transmitted to the resource restricted device; (b) after step (a), detecting a received message transmitted by the resource restricted device; (c) transmitting the ACK message or the buffered message to the resource restricted device after detection of the received message; the method further comprising repeating steps (a) to (c) after the ACK message or the buffered message has been transmitted, so that the buffer always contains a message ready to be sent.

14 Claims, 5 Drawing Sheets

(51) Int. Cl.
  *H04L 5/00* (2006.01)
  *H04L 12/703* (2013.01)
  *H04L 1/00* (2006.01)

(52) U.S. Cl.
  CPC .......... *H04L 1/1874* (2013.01); *H04L 1/1887* (2013.01); *H04L 5/0055* (2013.01); *H04L 45/28* (2013.01); *H04L 2001/0093* (2013.01)

(58) Field of Classification Search
  CPC ......... H04L 49/10; H04L 49/15; H04L 49/90; H04L 2012/5681; H04Q 11/06; H04Q 11/08
  USPC ................ 370/349, 368, 371, 378, 386, 412
  See application file for complete search history.

(56) References Cited

U.S. PATENT DOCUMENTS

| | | |
|---|---|---|
| 2006/0010430 A1 | 1/2006 | Cousot et al. |
| 2006/0039345 A1 | 2/2006 | Perez-Costa |
| 2008/0159183 A1 | 7/2008 | Lindoff et al. |

FOREIGN PATENT DOCUMENTS

| | | |
|---|---|---|
| CN | 101925060 A | 12/2010 |
| CN | 103095429 A | 5/2013 |
| EP | 1303072 A2 | 4/2003 |
| WO | 2013164105 A1 | 11/2013 |

\* cited by examiner

METHOD FOR OPERATING A NODE IN A NETWORK AND NODE DEVICE

CROSS-REFERENCE TO PRIOR APPLICATIONS

This application is the U.S. National Phase application under 35 U.S.C. § 371 of International Application No. PCT/EP2014/076805, filed on Dec. 8, 2014, which claims the benefit of European Patent Application No. 13196248.2, filed on Dec. 9, 2013. These applications are hereby incorporated by reference herein.

FIELD OF THE INVENTION

The present invention relates to field of wireless mesh networks, and devices configured therefor.

This invention is, for example, relevant for a wireless network like a ZigBee network, which comprises a resource restricted device, for example a ZigBee Green Power Device.

BACKGROUND OF THE INVENTION

In a wireless network having a resource restricted device, maintaining such resource restricted devices commissioned into a network is an issue. Indeed, such resource restricted devices are often in a not listening state, during which no messages, including configuration messages, e.g. indicating a change of operating channel, can be received.

A resource restricted device in the sense of this patent application is a node which is operating with very low power and may even have no power storage. It may be for example a ZigBee Green Power Device (also referred to by GPD). This kind of device may be able to transmit or receive only at some opportunities, for example after harvesting energy from the environment (e.g. in case of a light detector using the solar power to operate) or from the actuation by a user (e.g. in case of a battery less switch). Such reception opportunities can thus not always be scheduled in advance.

The bidirectional communication included in Green Power specification solves partially these issues. In accordance with this specification, some nodes in the vicinity of a resource restricted device may take the role of a proxy, which gathers all the messages addressed to the resource restricted device, and forwards it to the resource restricted device only when a reception opportunity is offered. As there may be a plurality of nodes that can take the role of proxy around a single resource restricted device, one of them can be elected as a master node (also referred as a TempMaster), so that only one node is transmitting a message at a time to the resource restricted device. This is crucial in Green Power specification to maximize the reception probability of the resource restricted device; because the reception opportunity of the resource restricted Green Power Device is—due to its power limitations—strictly time limited, so that the devices taking the role of the proxy cannot backoff or retry their transmission in cast of collision. The transmission via Temp-Master is used for example, when responding to a GPD packet. For this, a sink node, which is logically bound with the resource restricted device, selects a TempMaster from among the nodes in the vicinity of the resource restricted device (the devices may be proxies and/or sinks capable of Sink Table-based forwarding, including the sink node itself, if in range). The TempMaster shall forward Green Power Device Frames (GPDF) from the sink node to the resource restricted device. When the sink node has to transmit a message to the resource restricted device, it forwards the message to the TempMaster, which awaits the next reception opportunity of the resource restricted device to deliver the message.

When a ZigBee Green Power Device is transmitting a Green Power Device Frame, this GPDF may include a flag RxAfterTx=true, which indicates that after the transmission of this message a reception window will be opened. During this reception window, the TempMaster delivers the message to the GPD, (at least) 5 ms after the reception of the GPDF with RxAfterTx=true. Thus, there is a delay between the message generation and message delivery.

This mechanism of 'Reception After Transmission' was meant to be used for infrequent events, like channel or key update. Indeed, assuming very tight energy budget for resource restricted device, it is better to spend the energy on several attempts of transmission (the same message may be repeated in sequence 2 or 3 times to maximise the probability of reception) in broadcast mode (with a special address or no address i.e. to multiple potential receivers), rather than on sending in unicast to a particular receiver and waiting for an acknowledgement. In most wireless systems, listening has the same, or even higher, cost as/than transmitting. Moreover, the system may have no energy to act upon lack of acknowledgement at the timeout.

This transmit only behaviour with retries is fine if the GPDF non-reception on the GP infrastructure device (i.e. proxy and/or sink) side is caused by a temporary problem, like interference, fading or portability/proxy switching (which will be resolved by the GP protocol). However, if the network parameters (e.g. key, channel) have changed when the GPD was not operational, it will have no means of discovering the problem. Especially in the case of channel change, the network will likely also have no means of discovering the problem, since—having moved to the new channel—it will no longer receive the GPD's messages on the old channel. This problem is even more acute if the resource restricted device is communicating aperiodically (as may e.g. a user operated device, e.g. a light switch, or a device which transmission intervals depend on the amount of energy available (harvested), e.g. a sensor powered by a small solar cell, or flow of air or fluid): the system does not know when to expect a message and when to assume the resource restricted device is lost.

SUMMARY OF THE INVENTION

It is an object of the invention to propose a method for operating a node which alleviates the above mentioned problems.

It is another object of the invention to propose a method for operating a node to ensure that the loss of connection with the resource restricted device is detected rapidly.

To this end, in accordance with a first aspect of the invention, it is proposed a method for operating a node in a network comprising a resource restricted device, the method comprising the steps of (a) placing an ACK message in a buffer of the node, if said buffer does not contain a buffered message to be transmitted to the resource restricted device;

(b) after step (a), detecting a received message transmitted by the resource restricted device (c) transmitting the ACK message or the buffered message to the resource restricted device after detection of the received message, the method further comprising repeating steps (a) to (c) after the ACK message or the buffered message has been transmitted, so that the buffer always contains a message ready to be sent.

The main aim of the invention is to make sure that the resource restricted device is aware that the network is still present. The ACK may be transmitted to all resource restricted device or GPD capable of bidirectional communication, or only to selected ones. The GPD relaying on an ACK may request its delivery, e.g. by including a particular capability information in the commissioning information or by requesting it during operation, by a particular flag or dedicated command. The ACK delivery may also be initiated by the paired sink or another infrastructure device. The GPD for ACK delivery may be determined by their property, e.g. application type, security level or key type used, etc. The GPD may also be selected by the user according to other criteria. In case the resource restricted device does miss one (or more) ACK message or another message upon the reception opportunity, it may take action, e.g. to re-discover or rejoin the network, provide feedback to the user, etc. One of the main aspects of this invention is to always keep a buffered message at the TempMaster (proxy or sink) ready for transmission. It is thus possible to add an ACK message when no message is in the buffer queue for the resource restricted device. This ACK message may be self-replenishable for example. This self-replenishable property may be attributed to a particular message type, or be requested by an explicit flag in the request to deliver the message (e.g. as sent from the sink paired to the resource restricted device to the TempMaster, or as sent from the application on the TempMaster sink to its buffer), or by the fact of the message requiring a particular type of confirmation.

In accordance with this aspect of the invention, steps (a) to (c) are repeated after the ACK message or the buffered message has been transmitted, so that the buffer always contains a message ready to be sent, either an ACK message or a buffered message. By doing so, the buffer always contains a message ready to be sent to the resource restricted device. Hence, all the time required for the generation and preparation of the message can be done prior to the detection of the next message. An additional advantage is the minimum amount of communication between the sink node paired to the resource restricted device and the node acting as a TempMaster: as long as the TempMaster performs its role, it will keep a message in its buffer; the sink does not have to re-send the message for buffering (in case of Green Power, mostly being a broadcast) every time it sees a command from the resource restricted device that included an indication of reception opportunity. One further advantage is that the TempMaster node can continue delivering the acknowledgements to the resource restricted device even in the case of (temporary) absence of or communication problems with the sink node, thus keeping the resource restricted device active in the network.

Also, in some embodiments of the invention, other forwarding devices (proxies and sinks nodes in the range of the TempMaster) assist in always having a TempMaster node in place, even in the absence of communication from a particular resource restricted device, by monitoring TempMaster's other communication (e.g. Link Status messages, re-broadcasting frames, participation in route discovery and message routing, etc.), and triggering TempMaster election upon a detected change.

Moreover, if the resource restricted device uses a special command to poll for the systematic acknowledgement mode, this command does not have to be forwarded to the paired sink(s). It can be used solely to trigger message delivery from the TempMaster. It can be a dedicated message, e.g. a poll message, or a regular message with an indication that is used for acknowledgement polling, e.g. using a frame type, flag or skipping application payload. This way, forwarding of meaningless messages to the sink can be avoided and traffic of the network can be reduced, especially if the resource restricted device polls for the acknowledgement much more frequently than transmits content frames. It is only possible if the acknowledgement is self-replenishable; otherwise the paired sink would have to be involved in re-creating the acknowledgement frame anyway. This aspect is still combinable with GPD triggering TempMaster re-discovery upon missing acknowledgements, as well as with the other devices taking proxy role triggering the TempMaster election: the other devices would have to monitor the delivery of the acknowledgement messages to the resource restricted device; it is possible in the current Green Power specification, since the packets transmitted to the GPD identified by a SrcID are sent using MAC broadcast.

In accordance with an embodiment of the invention, the buffer includes a single-entry queue, meaning that only a single message addressed to a particular resource restricted device can be stored, as defined in the current Green Power specification.

In accordance with an embodiment of the invention, the buffer includes a multiple entry queue, meaning that multiple messages addressed to a particular resource restricted device can be stored; wherein step (a) further comprises placing an ACK message in the multiple entry queue if one the entries is available. Indeed, in case the queue is a multiple entry queue, and even if there is a buffered message in the queue, it is advantageous to fill an entry with an ACK message such that an ACK message is already ready for a following opportunity.

In accordance with another embodiment of the invention, step (c) is carried out if the received message includes an indication of reception opportunity. In another embodiment, step (c) is carried regardless of the indication of the reception opportunity. This may simplify and speed-up the delivery, and is best applicable to ACK message or other type of self-replenishable message.

Moreover, a transmission priority level may be introduced for the messages to be delivered to the resource restricted device; it may be set by the node generating the messages (e.g. central controller or sink) or by the TempMaster; e.g. based on the message type. The transmission priority level of the ACK message may be set to the minimum transmission priority level. Thus, the ACK message is only sent when there is no other message to be transmitted to the resource restricted device. Indeed, the other messages would also show to the resource restricted device that the network is still present and operational (and its configuration parameters, at least those observable by the resource restricted device, unchanged).

In a variant of the invention, step (c) is carried out regardless of whether the message from the resource restricted device detected at step (b) was decoded successfully. Indeed, the aim of the acknowledgement is to signal the presence of the receiving side with the suitable network configuration. It is to be noted that in view of the low computation power of typical implementations of the node, this node may not have sufficient time to completely decode the received message. The node has just to recognize that a message was sent from the resource restricted device in this embodiment of the invention. The partial decoding may range from simple filtering (e.g. by correct frame check sequence, identifier of the transmitting resource restricted device, transmission direction, etc.), to complete parsing and partial security check (e.g. indicated security level and key type, but not complete security check; freshness only but not encryption/authentication, or vice versa), to complete parsing and security check, but no application-level message decoding.

In case of the above variant where the buffer includes a single entry queue, then, when the single entry queue contains the buffered message, step (c) comprises transmitting the buffered message only if the payload of the received message was decoded successfully. Indeed, if the payload was not decoded successfully, this may mean that the channel conditions are not good or more likely that a configuration parameter of the resource restricted device is outdated, which may require some reconfiguration of the resource restricted device. Thus, transmitting the buffered message might be useless as the resource restricted device would not be able to decode it. Another reason for the message not being decoded successfully may be the fact of it being a spoofed message (e.g. by an attacked now knowing the proper security key and/or frame counter for the GPD being spoofed), so the buffered message should not be delivered upon such a trigger: on the one hand, the information should not be made available to the potential attacker, on the other hand, the buffered message must be delivered to the genuine GPD, especially if the buffered message is not self-replenishable.

In another alternative of the previous variant, the buffer includes a multiple entry queue. In this case, it is possible that step (c) comprises transmitting a message having the highest transmission priority level if the decoding of the message was successful, e.g. including successful payload decoding of the received message, transmitting the ACK message if the decoding message was only partially successful, e.g. if only the decoding of a header of the received message was successful. As seen above, the unsuccessful decoding may mean that a configuration parameter is outdated and requires a reconfiguration, or that the received frame is not genuine.

In both alternatives above, a (partially) unsuccessful decoding may trigger generation of a higher transmission priority message, e.g. a configuration message carrying the parameter update for the parameter that lead to decoding failure.

In any of the various embodiments discussed above, it is possible that step (c) is carried out so that the ACK message or the buffered message is transmitted during a reception window of the resource restricted device, said reception window starting after expiry of a time period starting when the transmission of the message from the resource restricted device is complete.

Since the propagation times are typically negligible, the completion of the transmission is approximated to be the completion of the reception of the message detected at step (b).

Moreover, the ACK message may not include a frame numbering identifier, since the aim of the transmission of the ACK message is not to signal the successful reception of a data packet. Moreover, this relaxes the requirements during the generation of the ACK message.

Alternatively, the method may comprise in a variant the steps of
a1) predicting a frame identifier of the next message from the resource restricted device,
a2) generating an ACK message including the predicted frame identifier.

These steps a1) and a2) are to be carried out before step a).

In yet another alternative, as part of step (c1) preceding step (c), the TempMaster node adds or updates the frame identified upon reception of a message from the resource restricted device indicating reception opportunity; thus, the frame identifier is always correct.

In accordance with a variant of this aspect of the invention, the ACK message is addressed to the resource restricted device. This means that an address field comprises the address or the identifier of the resource restricted device. This provides some way to distinguish the messages.

In accordance with a variant of this aspect of the invention, the ACK message is protected, e.g. encrypted, authenticated and/or allows for freshness check. This provides the GPD the means to verify that the ACK is genuine and/or fresh.

In still another variant of this aspect of the invention, step (c) is carried out so that the ACK message or the buffered message is transmitted during a reception window of the resource restricted device, said reception window starting after expiry of a time period starting when the transmission of the message from the resource restricted device, including message retries, is complete. This corresponds to the case of Reception After Transmission in case of a ZigBee Green Power network for example.

In a yet another variant of the present invention, the ACK message may be repeated several times, to increase the reliability of reception. It may be repeated in the one reception opportunity which follows after the resource restricted device finished the transmission of this message, incl. its retransmissions, as is currently required by the ZigBee Green Power specification. It may also be repeated in the transmission opportunities offered after transmission of a particular copy of the message, which typically would require larger time spacing between retries than the total transmission time of 5 ms currently allowed by the Green Power specification.

In a further variant of the present invention, the statistics of message reception, including ACK message and buffered message, if any, upon the reception opportunity, can be used by the GPD to determine its long term transmission strategy. For example, if the GPD by default uses three message retries, but it only receives acknowledgement to a percentage of messages lower than a first threshold t1, then it may increase the number of retries to e.g. four, or change other retry parameters, e.g. change retry time spacing. On the other hand, if the GPD by default uses three message retries, but it receives acknowledgement to a percentage of messages higher than a second threshold t2, then it may lower the number of retries, e.g. to two. This way, the GPD can better balance the energy budget and communication reliability.

The present invention also relates, in accordance with a second aspect, to a node having a communication unit for communicating in a network with at least one resource restricted device, the node comprising
a buffer including a queue of at least one message to be transmitted to the resource restricted device,
a receiver adapted to detect a received message from the resource restricted device,
a frame generator adapted to, prior to the detection of the received message, generate an ACK message and place said ACK message in the buffer if said buffer does not contain a buffered message to be transmitted to the resource restricted device, a transmitter adapted to transmit the ACK message or the buffered message to the resource restricted device upon detection of the received message;

wherein the frame generator is arranged, after transmission of the ACK message or the buffered message, to also generate an ACK message and place said ACK message in the buffer if said buffer does not contain a buffered message to be transmitted to the resource restricted device, so as to always maintain at least one a message ready to be sent in the buffer.

Still another aspect of the invention is a network comprising a first node as set forth in the second aspect of the invention and a resource restricted device.

In such a network, a plurality of second nodes in the vicinity of the resource restricted device may be provided, wherein the first node is configured to act as a master node for the resource restricted device, and wherein at least one of the first nodes and of the second nodes is adapted to trigger an election method for electing a new master node among the plurality second nodes instead of the first node upon detection of a failure of the first node, wherein the new master node is instructed to always maintain in its buffer a message ready to be sent to the resource restricted device. By doing so, the network can make sure the TempMaster is always operational and maintaining the link between the rest of the network and the resource restricted device.

In another aspect of the invention, it is proposed a computer program product comprising a code for executing instructions, when loaded on a controller, in accordance with the steps of the method of the first aspect of the invention.

Moreover, the invention could also be adapted for the transmission of configuration parameters to a resource restricted device. In accordance with this aspect of the invention, it is proposed a method for operating a node in a network comprising a resource restricted device, the method comprising the steps of (a) placing a configuration signal indicative a transmission property in a buffer of the node;

(b) after step (a), detecting a received message transmitted by the resource restricted device;

(c) transmitting the configuration signal to the resource restricted device after detection of the received message, the method further comprising repeating steps (a) to (c) until the received message is found to use said transmission property or a particular confirmation from the resource restricted device is received.

In an embodiment of this aspect of the invention, the transmission property is at least one of: an operational transmission channel, security key, security key type, security level, frame counter value, network identifier, device identifier, reporting interval, reporting threshold, command type.

Thus, instead of an ACK message, the buffer could be filled up automatically with a configuration signal so that it is transmitted at the next opportunity of reception of the resource restricted device. This automatic replenishment of the configuration signal would be continued until a confirmation that the resource restricted device uses the transmission property is detected, e.g. the resource restricted device is using the signaled configuration parameter, for example when the payload of the message transmitted by the resource restricted device is encrypted with the correct security key or until a it sends a confirmation message. Once the device detects that such payload is correctly encrypted or the particular confirmation, it could return to a normal operation mode. One or the other may be easier, depending on the type of the parameter updated and the type of device playing the TempMaster role (sink versus proxy); preferably the node triggering the resource restricted device parameter update indicates the successful delivery condition which will allow the TempMaster to return to normal operation mode.

This aspect of the invention could be combined the previous aspects of the invention. Moreover, it is also proposed to have a node configured for executing the steps of this previous aspect of the invention.

These and other aspects of the invention will be apparent from and will be elucidated with reference to the embodiments described hereinafter.

BRIEF DESCRIPTION OF THE DRAWINGS

The present invention will now be described in more detail, by way of example, with reference to the accompanying drawings, wherein.

DETAILED DESCRIPTION OF THE INVENTION

Figure 1:
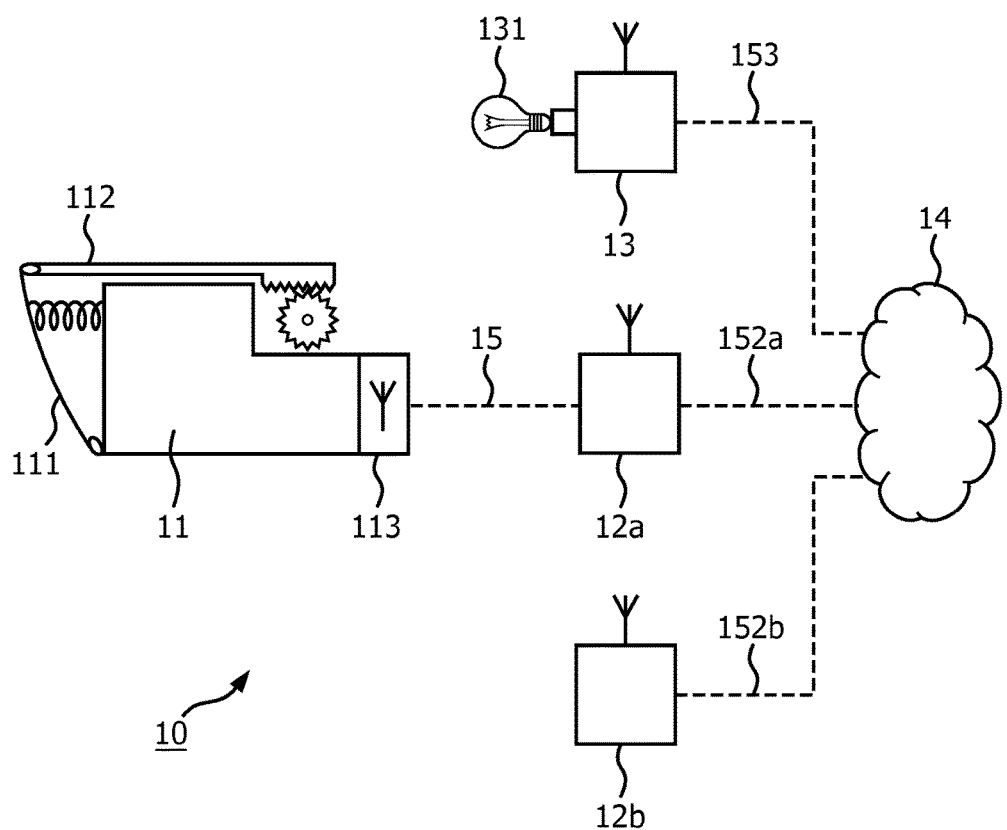
FIG. 1 is a block diagram of a network in which the invention is implemented.

Embodiments of the invention will now be shown with reference to a network as shown in FIG. 1. In this network 10, a resource restricted device 11 is operating with a plurality of other nodes 12a, 12b, a sink node 13 in the vicinity of the resource restricted node 11 and the rest of the network 14 represented schematically by a cloud.

The resource restricted device 11 is in this example a batteryless switch 11, comprising a switch 111 which can be actuated by a user. The actuation of this switch 111 enables the gear mechanism 112 to operate so as to harvest the energy, which is then used for communicating with the network 10 via a transceiver 113. The network may be configured so that the actuation of the switch 111 causes the resource restricted device 11 to transmit a command to a remote load, e.g. a lamp, connected to the network. This lamp is connected to a sink node, similar to the sink node 13 which includes a luminaire 131. Such a sink node is typically powered by the mains. In connection with this embodiment, a sink node is a device executing the commands transmitted by the resource restricted device. Typically, it is the node operating a lamp and which is controlled by a resource restricted device.

The two nodes 12a and 12b are configured so that each can take the role of proxy, i.e. they can forward messages to and from the resource restricted device, thus bridging the link between the resource restricted device and the rest of the network. The nodes taking the role of the proxy are typically powered by the mains. In this example, node 12a has been elected as a master node (or TempMaster) for the resource restricted node 11. Thus, the link 15 between the resource restricted device 11 and the node 12a is maintained through operation. In its TempMaster role, the node 12a forwards any message addressed to the resource restricted device 11 from the rest of the network 14 when there is a reception opportunity at the resource restricted device 11. The forwarding mechanism of the nodes 12a and 12b may be designed such that the node 12a is preferred to keep its TempMaster role if possible, e.g. by making the forwarding delay dependent on the signal strength and/or the fact of being first to forward in the past. The node 12a is linked to the rest of the network 14 by the logical link 152a. Further links may exist but are not shown for sake of clarity. Similarly, the node 12b is linked to the rest of the network 14 by the logical link 152b and the sink node 13 is linked to the rest of the network 14 by the logical link 153. It is to be noted that both the sink node 13 and the proxy node 12b may be elected as TempMaster if they have the suitable abilities and fulfil particular conditions, including being in direct radio range of the resource restricted device and having good signal quality on the link to the resource restricted device.

The resource restricted device may be controlling more than one sink in the network 14 but that is not shown for the sake of clarity. Other resource restricted devices may exist in the network 14, although not shown for the sake of clarity.

Figure 2A:
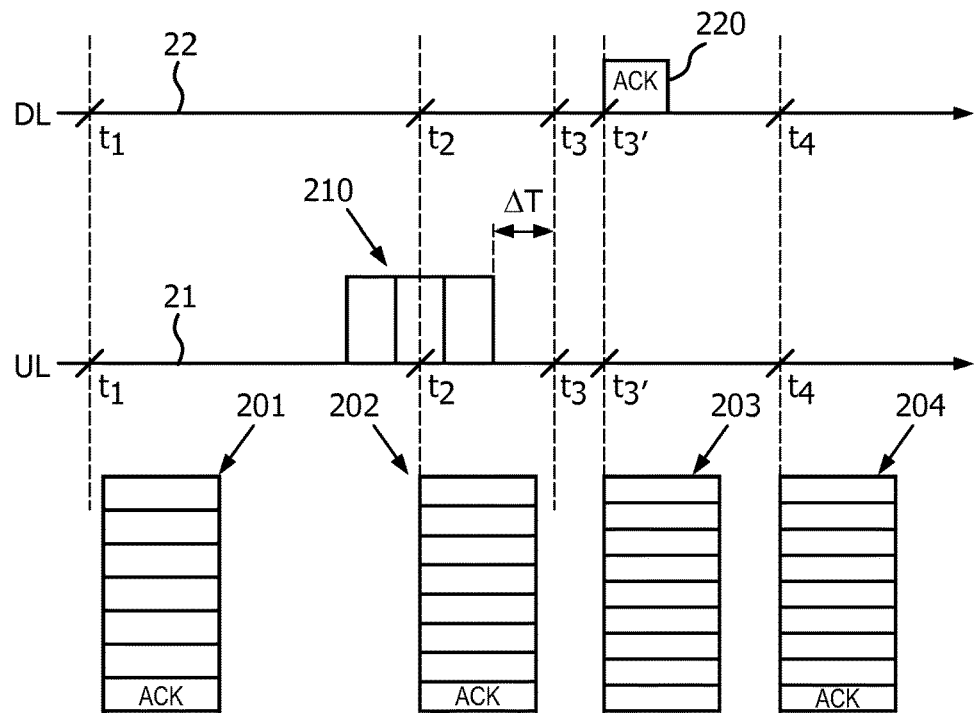
FIGS. 2A, 2B, 2C and 2D are chronograms showing the state of the buffer of a node in accordance with several embodiments of the invention.
Figure 2B:
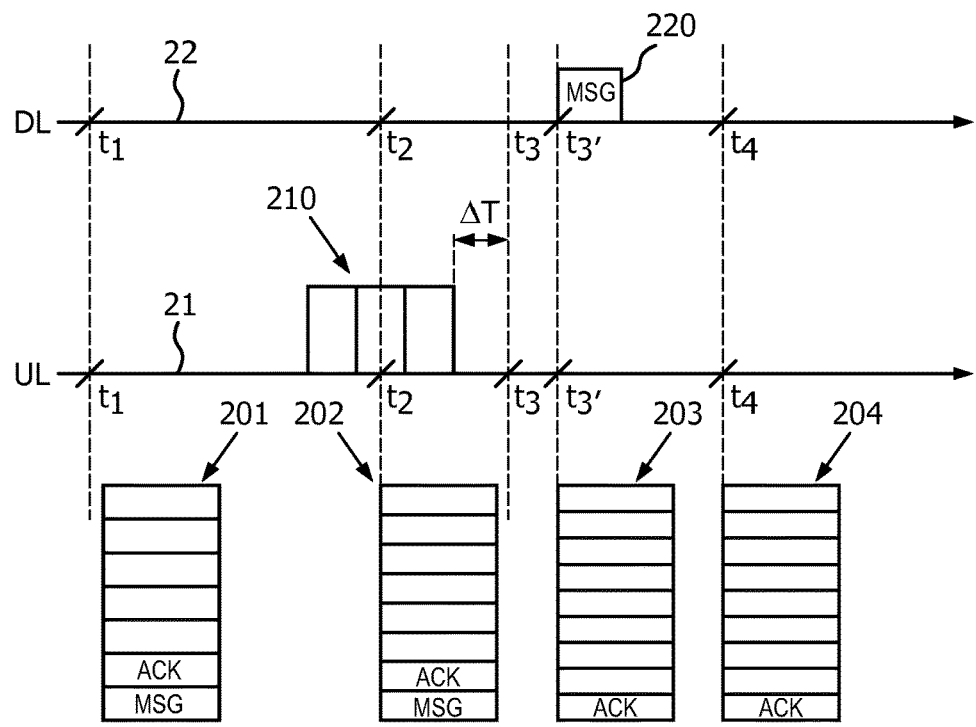
Figure 2C:
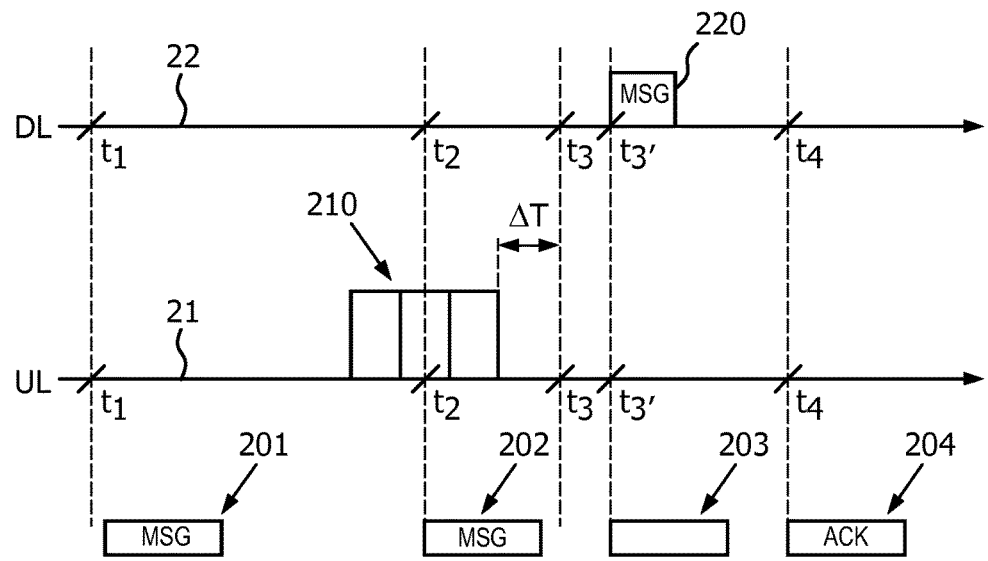

In accordance with an embodiment of the invention shown by the chronogram of FIGS. 2A-2C, the TempMaster node 12a comprises a buffer including the messages to be sent to the resource restricted device 11. This buffer can operate as a FIFO system, which means that, at transmission, the transmitted message is the one which entered the buffer the first. Similarly, in a basic embodiment, when a new message arrives in the buffer while the queue is full, the oldest message is discarded. This is typically the case when the buffer deals with only one a queue of a single priority level. However, in another implementation of the invention, the buffer can control a queue with messages having different priority levels. In this case, when a new message arrives in the buffer while the queue is full, the lowest priority message (being the oldest in case there are more than one message of the lowest priority) of the queue is discarded. Similarly, at transmission, the highest transmission priority level message (the oldest in cases there are more than one) is transmitted the first. Other buffer management strategies are also possible, some of which are presented by the examples in relation to FIGS. 2A-2D.

In the first example shown at FIG. 2A, the buffer comprises a queue with multiple entries for messages to be transmitted to a particular resource restricted device, and which is initially empty. The state of the buffer is shown by the tables 201, 202, 203 and 204 corresponding to time instants t1, t2, t3' and t4 respectively. In FIGS. 2A and 2B, the location of the message in those tables is indicative of the intended transmission order: the lower the message, the earlier it is intended to be transmitted. Note that those tables represent a buffer for one resource restricted device; a node in a proxy role may have buffers for transmission to multiple resource restricted devices; a particular number of queue entries can be allocated per resource restricted devices, or the devices may share the queue entries as available, possibly with a certain minimum guarantee of the number of entries per resource restricted device. In this chronogram is also shown the Uplink transmissions 21 (UL) from the resource restricted device 11 and the downlink transmissions 22 (DL) from the TempMaster node 12a to the resource restricted device 11.

At the beginning of this exemplary chronogram, at t1, the TempMaster node 12a generates an ACK frame and places it in accordance with the buffer state 201. Thus, the ACK frame is ready to be sent to the resource restricted device 11 at the next reception opportunity. Then, the resource restricted device 11 transmits a message 210, for example because the switch 111 has been actuated by a user. As shown on this drawing, the message 210 may be repeated a plurality of times, here 3 times (corresponding to the 3 blocks), so as to increase the probability of successful decoding of the message. This message 210 is detected at t2 by the TempMaster node 12a. According to the buffer state 202, there is no other message with a higher priority to transmit, the TempMaster node will transmit this ACK frame at the next reception opportunity. The message 210 may contain an indicator of the reception opportunity, e.g. a flag.

This reception opportunity starts at t3, after a predetermined amount of time ΔT after the end of transmission of the message 210. Thus, the TempMaster node transmits at t3' an ACK frame 220. This time instant t3' may be equal to t3 or occur shortly after t3 to take into account any error in the computation of the period ΔT.

At this point, since the ACK frame 220 is transmitted by the TempMaster node 12a, its buffer state 203 shows an empty queue. Shortly after t3', at time instant t4, the frame generator of the TempMaster node 12a creates a new ACK message and places it in the buffer queue. This is shown on the buffer state 204 which exhibits an ACK message.

In case of the second example shown at FIG. 2B, the buffer comprises a queue with multiple entries for messages to be transmitted to a particular resource restricted device, and which initially contains a message of high transmission priority level MSG.

At the beginning of this exemplary chronogram, at t1, the TempMaster node 12a generates an ACK frame, which has a lower transmission priority level, and places it in accordance with the buffer state 201 above the message MSG in the queue. The message MSG frame is ready to be sent to the resource restricted device 11 at the next reception opportunity, the ACK frame being ready for another following opportunity (unless a new message of higher priority than the ACK message needs to be sent). Then, the resource restricted device 11 transmits a message 210, for example because the switch 111 has been actuated by a user, and which is detected at t2 by the TempMaster node 12a. According to the buffer state 202, there is no other message with a higher priority to transmit than the message MSG, thus the TempMaster node will transmit this MSG frame at the next reception opportunity. The message 210 may contain an indicator of the reception opportunity, e.g. a flag.

This reception opportunity starts at t3, after a predetermined amount of time ΔT after the end of transmission of the message 210. Thus, the TempMaster node transmits at t3' an MSG frame 220. This time instant t3' may be equal to t3 or occur shortly after t3 to take into account any error in the computation of the period ΔT.

At this point, since the MSG frame 220 is transmitted by the TempMaster node 12a, its buffer state 203 shows a queue with only the ACK frame being present. Shortly after t3', at time instant t4, the frame generator of the TempMaster node 12a may create a new ACK message and place it in the buffer queue, since there is an empty entry in the buffer queue. However, alternatively, it is also possible that no further ACK frame is created since there is already one buffered message in the queue. This is what is shown on the buffer state 204 which exhibits one ACK message.

In the third example shown at FIG. 2C, the buffer comprises a queue with a single entry for messages to be transmitted to a particular resource restricted device. This corresponds to the current typical implementation of a ZigBee Green Power proxy node. In this example, the queue comprises already a buffered message MSG.

At the beginning of this exemplary chronogram, at t1, the TempMaster node 12a does not generate an ACK frame since there is already a buffered message MSG in accordance with the buffer state 201. The MSG frame is ready to be sent to the resource restricted device 11 at the next reception opportunity. Then, the resource restricted device 11 transmits a message 210, for example because the switch 111 has been actuated by a user. As shown on this drawing, the message 210 may be repeated a plurality of times, here 3 times (corresponding to the 3 blocks), so as to increase the probability of successful decoding of the message. This message 210 is detected at t2 by the TempMaster node 12a. According to the buffer state 202, there is no other message with a higher priority to transmit, the TempMaster node will transmit this MSG frame at the next reception opportunity.

Thus, the TempMaster node transmits at t3' an MSG frame 220. This time instant t3' may be equal to t3 or occur shortly after t3 to take into account any error in the computation of the period ΔT. Typically 5 ms after the end of transmission from the resource restricted device, the reception window opens.

At this point, since the MSG frame 220 is being transmitted by the TempMaster node 12a, its buffer state 203 shows an empty queue. Shortly after t3', at time instant t4, the frame generator of the TempMaster node 12a creates a new ACK message and places it in the buffer queue. This is shown on the buffer state 204 which exhibits an ACK message.

In the case of a single-entry queue, upon request to buffer a high transmission priority level message the ACK message will be replaced by the high transmission priority level message. The automatically-generated ACK message should not replace the high transmission priority level message. That's illustrated in the fourth example shown in FIG. 2D.

Figure 2D:
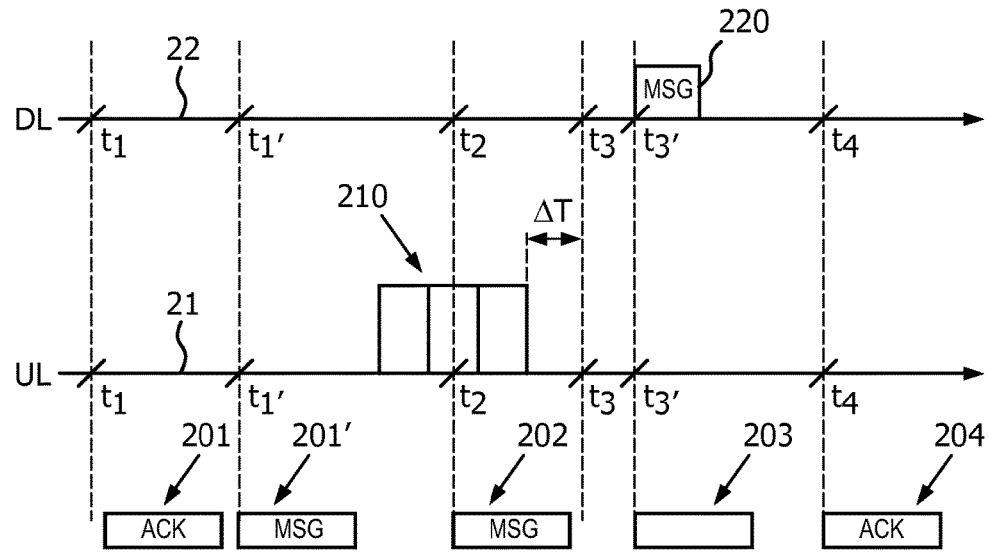

In FIG. 2D, the buffer comprises a queue with a single entry for messages to be transmitted to a particular resource restricted device. This corresponds to the current typical implementation of a ZigBee Green Power proxy node. In this example, the queue is initially empty.

At the beginning of this exemplary chronogram, at t1, the TempMaster node 12a generates an ACK frame and places it in accordance with the buffer state 201. Thus, the ACK frame is ready to be sent to the resource restricted device 11 at the next reception opportunity. Then, at t1', the TempMaster receives a message of high transmission priority level MSG. Message MSG can be received over the air or generated by a process on the node 12a. Since the ACK message has lower transmission priority, the node 12a replaces the ACK message in the buffer with the message MSG, as shown in 201. Thus, at t1', the MSG frame is ready to be sent to the resource restricted device 11 at the next reception opportunity. Then, the resource restricted device 11 transmits a message 210, for example because the switch 111 has been actuated by a user. As shown on this drawing, the message 210 may be repeated a plurality of times, here 3 times (corresponding to the 3 blocks), so as to increase the probability of successful decoding of the message. This message 210 is detected at t2 by the TempMaster node 12a. According to the buffer state 202, there is no other message with a higher priority to transmit, the TempMaster node will transmit this MSG frame at the next reception opportunity.

Thus, the TempMaster node transmits at t3' an MSG frame 220. This time instant t3' may be equal to t3 or occur shortly after t3 to take into account any error in the computation of the period ΔT. Typically 5 ms after the end of transmission from the resource restricted device, the reception window opens.

At this point, since the MSG frame 220 is being transmitted by the TempMaster node 12a, its buffer state 203 shows an empty queue. Shortly after t3', at time instant t4, the frame generator of the TempMaster node 12a creates a new ACK message and places it in the buffer queue. This is shown on the buffer state 204 which exhibits an ACK message.

In all the examples given in relation to FIG. 2A-2D, the buffer management (addition of frames, frame ordering) is done upon transmission of message to the resource restricted device, upon reception of high(er) transmission priority message or upon initialisation of the TempMaster role. There may be further triggers for buffer management, including expiration of a lifetime of a message in the queue; request, local or received over the air, to remove a particular message from the queue; removal of the resource restricted device from the network, configuration change of the resource restricted device, application change of the sink node paired to the resource restricted device.

Figure 3:
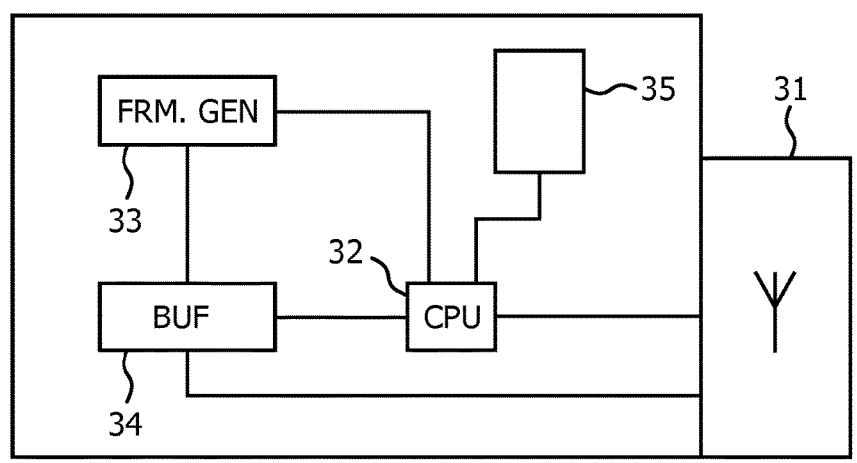
FIG. 3 is a block diagram representing a node in accordance with an embodiment of the invention.

An exemplary embodiment of a device 12a implementing the invention will now be described in more details with reference to FIG. 3. The device 12a comprises a transceiver 31 which enables the communication with the rest of the network and with a resource restricted device. A microcontroller CPU 32 controls the transceiver 31 in accordance with a software loaded on a memory 35. The software may consist of blocks with dedicated functionality, e.g. separate yet possibly interconnected via interfaces blocks, e.g. for communication with the network and for communication with the resource restricted devices; yet more fine grained functionality splitting is possible. The blocks may be configurable selectively or the software may be loaded as a whole. To prepare the frames to be sent over the transceiver 31, the device 12a comprises a frame generator FRM GEN 33, controlled by the microcontroller 32 in accordance with the software loaded on memory 35. Once a frame has been created by the frame generator, it is loaded into a buffer BUF 34, for subsequent transmission by the transceiver 31. This buffer typically contains a logical queue per device to which the device 12a intends to communicate with. In the example of FIG. 1, the buffer 34 of the device 12a would contain at least a first buffer queue for the messages intended for the resource restricted device 11. These buffer queues usually have a single entry (i.e. they can only contain a single buffered message each), however some or all of these queues could contain multiple entries (i.e. at least one of the buffer queues could contain more than one buffered message). Furthermore, in case of multiple-entry queues, a particular number of queue entries can be allocated per resource restricted devices, or the devices may share the queue entries as available, possibly with a certain minimum guarantee of the number of entries per resource restricted device.

During operation in accordance with the invention, when the queue dedicated to the resource restricted device 11 is empty, the CPU 32 commands the frame generator to create an ACK frame for the resource restricted device 11 of FIG. 1, which is then placed into the buffer 34. In case the queue dedicated to the resource restricted device 11 is a multiple entry queue, the CPU could check whether one of the multiple entries is empty and commands to the frame generator 33 to create a new ACK message to be supplied to the buffer 34. Then, when the transceiver 31 receives a message from the resource restricted device 11, the microcontroller 32 can check whether a transmission opportunity will be present. If this is the case, it then orders the buffer 34 to release a message for transmission by the transceiver 31. Further processing of the received frame may be applied, including filtering (e.g. by destination or source address, network identified, frame direction, frame identifier, security parameters), security check and application payload decoding, prior to ordering the buffer 34 to release the message for transmission. The amount of processing may further be dependent on the transmission priority of the message to be transmitted. The released message can be the highest priority message present in the queue, or the oldest message in case the queue is a multiple entry queue. In case of a single entry queue, the buffered message, i.e. either a newly created ACK message or a message that was present before is transmitted to the resource restricted device 11. The message may be further processed before transmission, e.g. the frame numbering identifier may be updated or security processing may be applied.

The whole process in accordance with an embodiment of the invention will now be explained in detail with reference to FIG. 4.

The initialisation of this operational mode occurs at step S400, when node 12a is elected as a master node (Temp-Master) of the resource restricted device 11. Other events may also trigger this procedure, incl. including expiration of a lifetime of a message in the queue, request to remove particular message from the queue, removal of the resource restricted device from the network, etc. Then, at step S401, node 12a checks whether the buffer queue dedicated to the resource restricted device 11 is empty or already contains a buffered message. In case the buffer queue is empty, the frame generator 33 of the node 12a is ordered at step S402 to create an ACK frame and add it into the buffer queue dedicated to the resource restricted device. In case the buffer queue already contains a buffered message, it is checked at step S403 whether the buffer queue contains an available entry. This step is omitted in case the buffer queue is a single entry queue. This step may also be omitted if the message in the queue is an ACK message. If it was determined at step S403 that an entry of the queue dedicated to the resource restricted device is available, then the method goes to step S402 to create an ACK message which is then added into the buffer queue dedicated to the resource restricted device. Thus, it is made sure with the previous steps that a message is ready to be sent to the resource restricted device at the next transmission opportunity. In case there is no available entry into the buffer queue, or the queue already contains an ACK, the method goes directly to the next step S404.

Then, the node 12a waits for a message which is detected at step S404. The microcontroller 32 of the node 12a determines whether a reception opportunity is scheduled at step S405. This can be done for example by decoding the header of the received message and checking whether an RxAfterTx flag is set. However, it is to be noted that this step may be optional since the resource restricted device could be configured to always receive after transmission, such that a reception opportunity is always following the message from the resource restricted device 11. Also, this step may be optional for simplicity of implementation of the node 12a; it may deliver the message upon every received message from the resource restricted device. This may be further restricted to delivering ACK messages only; for the high transmission priority messages the reception opportunity could still be checked. If it is determined at step S405 that no reception opportunity will follow, the process goes back to step after S402 or in this example before step S401. Alternatively, the process may go back to before step S404; with explicit checks of the buffer being triggered by other means than reception of a message without a reception opportunity. Besides, the node 12a will handle the message in accordance with a configured process (HNDL), which may require updating local copy of information about the resource restricted node 11, forwarding the message to another node and/or take some action on the payload. This part being out of the scope of this invention, it will not be included in further details in this description.

If it is determined at step S405 that a reception opportunity will follow, in addition to the previously mentioned handling of the message (HNDL), the node 12a can transmit a buffered message to the resource restricted device 11 in the following steps, for example as soon as the reception opportunity starts. In case of a single entry buffer queue, in a first variant, the buffered message may be transmitted regardless whether all or part of the message was correctly decoded or not. For example, the received message may in fact be wholly corrupted, such that the handling of the information that the received message contains is impossible. Still, the ACK message or the buffered message (if it was determined that the buffer was not empty at step S401) is transmitted. In another example, the received message may comprise a header and a payload where the payload is encoded, or even encrypted. The header may be sent with lower requirement to ensure that this transmission of this header is more robust. For example, it may have a lower data rate, or be encoded with a simpler code or not be encrypted. In such an exemplary variant, the buffered message may be sent only if this header is correctly decoded, regardless whether the payload itself can be decoded. In case the header is not decoded properly in accordance with this example, the node may is not transmitting anything. In another example, the ACK message may be delivered regardless of whether the security check of the payload of the received frame was successful or not. In yet another example, the ACK message may be delivered regardless of whether the application payload of the received frame was successfully decoded or not.

Figure 4:
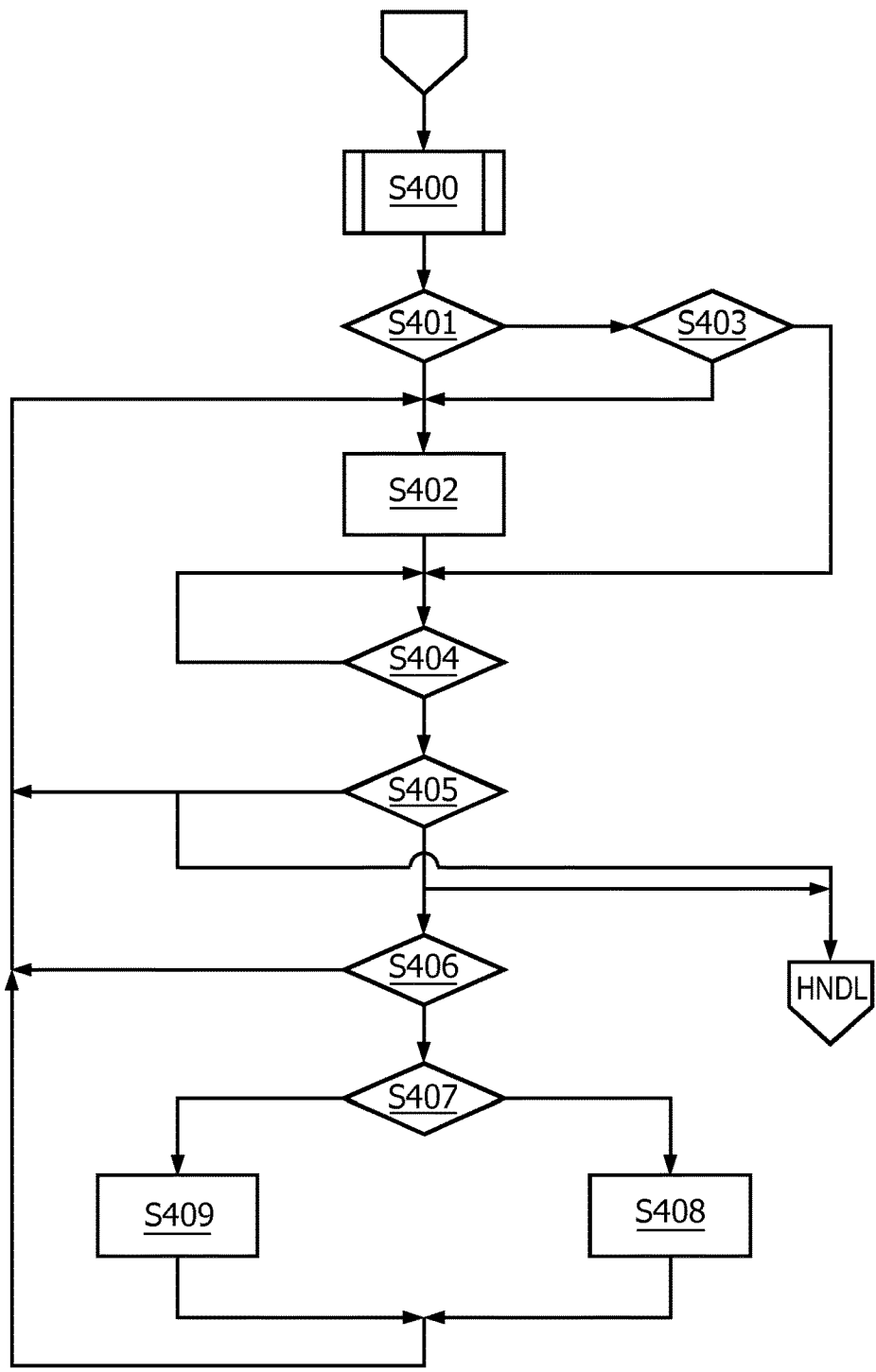
FIG. 4 is a flowchart representing the method in accordance with an embodiment of the invention.

Back to the example of FIG. 4, the buffer queue dedicated to the resource restricted device 11 is in this example a multiple entry queue. In this example, the buffered messages may have different transmission priority levels. However, in a variant, the buffer may behave exactly like a basic FIFO, i.e. the oldest message of the queue is the one sent. At step S406, the node 12a checks whether the header is decoded correctly. This step S406 may be omitted and combined in step S405 for example if the occurrence of the transmission opportunity can be determined only by decoding the header. If the header was not successfully decoded, the node 12a may not transmit anything and the process can go back to after S402 or, in this example, before step S401 (or before step S404). If, however it is determined at step S406 that the header was decoded, the node 12a checks whether the further processing of the received message, in this particular example security check, was successful at step S407. If the security check was successful, the node 12a transmits the message of the queue having the highest transmission priority level at step S408 (e.g. Channel Configuration or Commissioning GPDF or application GPDF, e.g. for modifying an application parameter of the GPD, such as measurement threshold or reporting interval). The ACK message is set in this example with the lowest transmission priority level, therefore, the ACK message is sent in this case only if there is no other message in the queue. If at step S407 the security check failed, the node 12a transmits the ACK message at step S409 regardless whether there is another buffered message in the queue. The reason of this different transmission decisions is that in case the resource restricted device message was not decoded properly means very likely that a configuration parameter (like a security key) was not updated at the resource restricted device. Thus, it is very likely that the resource restricted device would be unable to decode a complex message. The ACK message is still sent to inform the resource restricted device that the network is still present. Depending on the cause of the processing failure, more complex selection of the message for transmission is possible. For example, if the security processing failed due to incorrect message integrity code, which is likely indicative of the resource restricted device being in possession of a wrong key, the node 12a at step S407 could check if any of the higher transmission priority messages includes or is of type that can include a key update and choose to deliver that message; e.g. deliver GPD Commissioning Reply message rather than GPD Write Attributes command which might have been scheduled for earlier delivery. Furthermore, at the TempMaster, the incorrect processing of the received message from the resource restricted device may trigger to recommissioning or repairing the configuration of the resource restricted device, e.g. by triggering generation of appropriate (high transmission priority level) configuration message.

After the transmission of either the ACK message (S409) or of the highest transmission priority level message (S408), the process is then returned to after S402 or before step S401 in a variant of this embodiment.

As seen above, the node in accordance with the embodiments of this invention is capable to always keep the acknowledgement frame (the ACK message) in the system, to be prepared for delivering it when the resource restricted device is listening. As seen above, thanks to the process, the acknowledge frame is self-replenishable. As seen in the above example, this can be done by replacing the ACK message by a new one as soon the ACK message has been transmitted.

The ACK message can be defined as a specific message for ZigBee Green Power compatible device. This ACK message can carry the address of a particular device, the resource restricted device to which it is sent. In an example, the ACK message does not have a frame counter in the payload, so that it can be put into the system in advance. However, it could be possible to have a frame counter by predicting the frame counter of the next message from the resource restricted device, so that reception of a particular frame can be acknowledged subsequently, or to fill in the frame counter value upon reception of the message from the resource restricted device, to guarantee it has a correct value. The ACK message may be sent protected (authenticated and/or encrypted by a security key) or it may be sent unprotected (not authenticated and/or encrypted). The ACK message may carry some additional information, e.g. particular configuration parameter, it may also carry no additional information or even be payloadless.

As explained above, the ACK message can be used for acknowledging the transmission from the resource restricted device, i.e. transmit an ACK message upon detection of the message from the resource restricted device, regardless it has been decoded properly. It can also be used to acknowledge the successful reception of the message.

The above described embodiments can be further improved by a proactive election of a new TempMaster in case other nodes detect the absence of ACK message to a particular resource restricted device. Moreover, this particular behaviour described earlier can be stopped when a new TempMaster is nominated, or when the resource restricted device is un-paired or removed from the network.

Delivery of an ACK message may require a TempMaster to always be in place. In accordance with some embodiments of the invention, in case of non-delivery of the ACK message, the resource restricted device may trigger automatic behaviour. A first example of such behaviour is a change in the transmission property of the resource restricted device. More specifically, when the resource restricted device receives systematically the ACK message, it can assume that the link between the resource restricted device and its TempMaster is of good quality. Thus, transmission requirements can be relaxed, for example by reducing the amount of repetitions of the messages transmitted from the resource restricted device. Typically, in ZigBee Green Power, the resource restricted device transmits a message by repeating 3 times an identical message such that it increases the probability of correct reception. This number of repetitions may be decreased in case the resource restricted device estimates the connection with its TempMaster is of good quality. On the contrary, when it is estimated by the resource restricted device that the connection is of low quality because some of the transmitted messages where not acknowledged, the number of repetitions may be increased. When the resource restricted device finds that all its messages are not acknowledged, it can send some particular commands to trigger a new election of a TempMaster. Furthermore, it can trigger another behaviour on the resource restricted device, e.g. extending the reception opportunity, by making it longer or more frequent, recomissioning or an attempt to find back the network, e.g. by channel toggling. It may provide user feedback, e.g. flash a red LED (in case of user-activated resource restricted device, preferably upon the next user interaction), to indicate transmission problems.

In connection to another embodiment, other devices in the proxy role could keep track of the TempMaster. E.g. by storing its address, e.g. in the proxy table entry.

Since the devices in the proxy role are all in range of the resource restricted device, at least some of them are likely to be in the range of the TempMaster as well. Thus, they may notice events related to this TempMaster node, either based on ZigBee communication, e.g. lack of Link Status message, broken route, Device_annce sent from a new position etc. Upon detection of the TempMaster being (temporarily) gone, they may trigger election of a new TempMaster, not waiting for this to be triggered by the next message reception from the resource restricted device.

Alternatively, or in addition, the devices in the proxy role could keep track of the Green Power-related communication, e.g. the GP Notifications forwarded by the TempMaster (which should be the first-to-forward), and trigger new TempMaster election upon its absence/irregularity.

The TempMaster election can be performed by the sink(s) or another device, e.g. a commissioning tool or node manager—then they may need to be informed about TempMaster disappearance, esp. in the case of other proxies detecting this by monitoring ZigBee messages. It can also be performed by the proxies, resulting in nomination of the new first-to-forward proxy.

Note that sink—if capable of direct reception and in range of the GPD—can also play a TempMaster role.

Sink may instruct the TempMaster to make a particular message, ACK or another message, self replenishable.

It is to be noted that not all the resource restricted device need the ACK message, and this may configured by the resource restricted device.

An extension of the embodiments discussed above proposes a method for operating a node in a network comprising a resource restricted device, the method comprising the steps of (a) placing a configuration signal indicative a transmission property in a buffer of the node;

(b) after step (a), detecting a received message transmitted by the resource restricted device;

(c) transmitting the configuration signal to the resource restricted device after detection of the received message, the method further comprising repeating steps (a) to (c) until the received message is found to use said transmission property.

In this case, instead of transmitting an ACK message, the TempMaster may maintain a configuration update message in the buffer such that it is transmitted at all the reception opportunities of the resource restricted device. This operational mode is maintained until the resource restricted device is using the indicated transmission property or sends a particular confirmation message. In this example, the transmission property is at least one of: an operational transmission channel, security key, security key type, security level, frame counter value, network identifier, device identifier, reporting interval, reporting threshold, command type.

This embodiment can be combined with the previous embodiments. For example, the TempMaster starts by transmitting ACK systematically as described before by maintaining the ACK message in the buffer even before the decoding of the message is performed. If it is found that the resource restricted device is not using the latest configuration parameters, the TempMaster may decide to enter into this other operational mode, where the configuration frame is regenerated in the buffer to be transmitted at every reception opportunities. When the correct configuration parameter is eventually used, the TempMaster can re-enter the normal operational mode.

As seen above, thanks to the embodiments of the invention, an acknowledgement frame to the resource restricted device capable of bidirectional communication can always be kept in the system, to be readily deliverable when the resource restricted device reception window opens.

While the invention has been illustrated and described in detail in the drawings and foregoing description, such illustration and description are to be considered illustrative or exemplary and not restrictive. The invention is not limited to the disclosed embodiment with the amps or luminaires as load devices. It can be implemented in connection with any type loads, sensors, switches and the like.

Other variations to the disclosed embodiments can be understood and effected by those skilled in the art in practicing the claimed invention, from a study of the drawings, the disclosure and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage.

The foregoing description details certain embodiments of the invention. It will be appreciated, however, that no matter how detailed the foregoing appears in text, the invention may be practiced in many ways, and is therefore not limited to the embodiments disclosed. It should be noted that the use of particular terminology when describing certain features or aspects of the invention should not be taken to imply that the terminology is being re-defined herein to be restricted to include any specific characteristics of the features or aspects of the invention with which that terminology is associated.

A single unit or device may fulfil the functions of several items recited in the claims. The mere fact that certain measures are recited in mutually different dependent claims does not indicate that a combination of these measures cannot be used to advantage.

The invention claimed is:

1. A method for operating a node in a network, said network further comprising a resource restricted device, the method comprising the steps of (a) placing an ACK message in a buffer of the node, when said buffer does not contain a buffered message to be transmitted to the resource restricted device;

(b) after step (a), detecting a received message transmitted by the resource restricted device;

(c) transmitting the ACK message or the buffered message to the resource restricted device after detection of the received message;

the method further comprising repeating steps (a) to (c) after the ACK message or the buffered message has been transmitted, wherein the buffer always contains a message ready to be sent.

2. The method of claim 1, wherein step (c) is carried out if the received message includes an indication of reception opportunity during which the resource restricted device is able to receive.

3. The method of claim 1, wherein the buffer includes a multiple entry queue, wherein step (a) further comprises also placing an ACK message in the multiple entry queue if one of the entries is available.

4. The method of claim 1, wherein the transmission priority level of the ACK message is set to the minimum transmission priority level.

5. The method of claim 1, wherein the buffer includes a multiple entry queue, and wherein step (c) comprises finding the message having the highest transmission priority level in the multiple entry queue of the buffer, and transmitting said message.

6. The method of claim 1, wherein step (c) is carried out regardless of whether the payload of the received message was decoded successfully.

7. The method of claim 1, wherein the buffer includes a single entry queue, wherein, when the single entry queue contains the buffered message, step (c) comprises transmitting the buffered message only if the payload of the received message was decoded successfully.

8. The method of claim 1, wherein the buffer includes a multiple entry queue, and wherein step (c) comprises transmitting a message having the highest transmission priority level if the decoding of a payload of the received message was successful and transmitting the ACK message if only the decoding of a header of the received message was successful.

9. The method of claim 1, wherein step (c) is carried out so that the ACK message or the buffered message is transmitted during a reception window of the resource restricted device, said reception window starting after expiry of a time period starting when the transmission of the message from the resource restricted device is complete.

10. A node having a communication unit for communicating in a network with at least one resource restricted device, the node comprising a buffer including a queue of at least one message to be transmitted to the resource restricted device, a receiver configured to detect a received message from the resource restricted device, a processor configured to, prior to the detection of the received message, control generation of an ACK message and place said ACK message in the buffer when said buffer does not contain a buffered message to be transmitted to the resource restricted device, a transmitter configured to transmit the ACK message or the buffered message to the resource restricted device upon detection of the received message;

wherein the processor is arranged to also generate an ACK message and place said ACK message in the buffer when said buffer does not contain a buffered message to be transmitted to the resource restricted device after transmission of the ACK message or the buffered message, wherein the buffer always maintain at least one message ready to be sent.

11. A network comprising a first node as set forth in claim 10 and a resource restricted device.

12. The network of claim 11, further comprising a plurality of second nodes in the vicinity of the resource restricted device, wherein the first node is configured to act as a master node for the resource restricted device, and wherein at least one of the first node and of the second nodes is adapted to trigger an election method for electing a new master node among the plurality second nodes instead of the first node upon detection of a failure of the first node.

13. A computer program product comprising a non-transitory computer readable medium encoded with instructions when being executed by a controller causing the controller to perform the method of claim 1.

14. A method for operating a node in a network comprising a resource restricted device, the method comprising the steps of (a) placing a configuration signal indicative of a transmission property in a buffer of the node;

(b) after step (a), detecting a received message transmitted by the resource restricted device;

(c) transmitting the configuration signal to the resource restricted device after detection of the received message, the method further comprising repeating steps (a) to (c) until a confirmation that the resource restricted device uses said transmission property is detected;

wherein the transmission property is at least one of: an operational transmission channel, security key, security key type, security level, frame counter value, network identifier, device identifier, reporting interval, and command type.

* * * * *